No. 872,770. PATENTED DEC. 3, 1907.
A. H. & J. H. SYMONS.
BALE TIE MACHINE.
APPLICATION FILED DEC. 26, 1906.

Witnesses
Frank R. Glore
H. C. Rodgers

Inventors
A. H. Symons & J. H. Symons
By George H. Thorpe Atty

UNITED STATES PATENT OFFICE.

ARTHUR H. SYMONS AND JABEZ H. SYMONS, OF KANSAS CITY, MISSOURI.

BALE-TIE MACHINE.

No. 872,770.      Specification of Letters Patent.      Patented Dec. 3, 1907.

Application filed December 26, 1906. Serial No. 349,384.

*To all whom it may concern:*

Be it known that we, ARTHUR H. SYMONS and JABEZ H. SYMONS, citizens of the United States, residing at Kansas City, in the county of Jackson and State of Missouri, have invented certain new and useful Improvements in Bale-Tie Machines, of which the following is a specification.

This invention relates to automatic bale tie machines, and our object is to produce a machine of this character whereby bale ties of variable length may be expeditiously produced.

A further object is to produce a machine of this character which will operate efficiently and reliably and of such construction and organization as to require attention infrequently and seldom need repair or adjustment other than to effect a variation in the length of the ties.

With these general objects in view and others as hereinafter appear, the invention consists in certain novel and peculiar features of construction and combinations of parts as hereinafter described and claimed; and in order that it may be fully understood reference is to be had to the accompanying drawings, in which—

In the said drawings, 1 indicates a suitable cast metal or equivalent table provided at its front end with bearings 2, for a transverse shaft 3 equipped at one end with a balance wheel 4 and at the other with fast and loose pulleys 5 and 6, respectively. To shift the drive belt, not shown, from one of said pulleys to the other, a belt shifter is mounted slidingly in the table, the same comprising a pair of arms 7 to engage the opposite edges of the belt, and a bar 8, the latter terminating at its opposite end in an angular portion 9 which forms a handle and likewise engages the table with a sliding relation.

10 is a bevel gear secured rigidly on shaft 3 and meshing with a similar gear 11 on the front end of a longitudinal shaft 12 journaled in bearings 13 and 14 of the table. Rigidly mounted on said shaft is a small pinion 16 and a larger gear 15, the latter meshing with a gear 17 rigidly secured on the hollow or tubular twister shaft 18 paralleling shaft 12 and journaled in bearings 19 of the table. The pinion 16 meshes with a gear wheel 20 depending through an opening 21 in the table and secured rigidly on a longitudinal shaft 22 vertically below shaft 12 and like the latter journaled in bearings 13, 14.

23 is a small pinion rigidly secured on shaft 22 and meshing with the large gear 24 rigidly secured on longitudinal shaft 25 journaled in bearings 26 of the table. The wheel 20 meshes with a small gear 27 rigidly secured on a longitudinal shaft 28 underlying the bed of the table and journaled at its front end in a bearing 29 depending from said bed. The opposite end of shaft 28 is preferably journaled in and projects beyond the rear end of the table and carries at such end a bevel gear 30 meshing with a bevel gear 31, on the lower end of a short vertical shaft 32 journaled in a bracket 33 erected upon the table and longitudinally adjustable thereof.

34 is a sprocket wheel secured rigidly on shaft 32 and connected by a chain 35 to a second sprocket wheel 36, the last-named sprocket wheel having a peripheral flange 37 for a purpose which hereinafter appears. Said sprocket wheel is mounted on a short vertical shaft 38 journaled in a bracket 39 similar to bracket 33 and adjustably mounted by preference on a cross bar 40 of the table, there being preferably several such cross bars as the length of the table is sufficient to accommodate bale ties of the maximum length, and projecting upward from the cross bars are posts 41 as a support for a pair of parallel trackways which underlie the chain 35 and consist of bottom plates 42, in the horizontal plane of flange 37 of sprocket wheel 36, provided at their side margins and upper sides with longitudinal strips 43 to form channels for said trackways and with longitudinal strips 44 secured upon strips 43 and flanging inwardly beyond the same, to form parallel guide grooves for the trackway.

Figures 9, 10, 17:
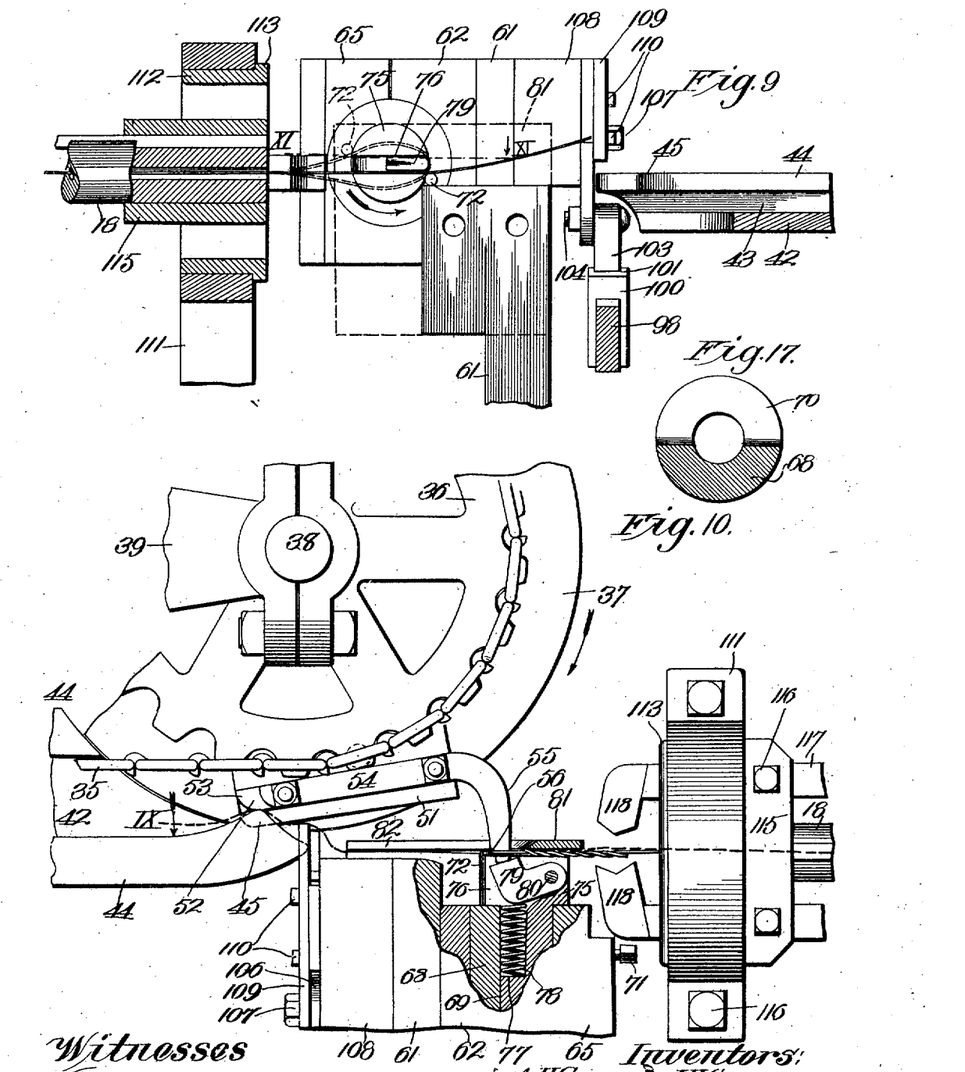
Fig. 9 is a section on the dotted line IX of Fig. 10.
Fig. 10 is an enlarged view showing the twisting mechanism in plan, the looping mechanism partly in plan, and partly broken away, and the conveyer in elevation and in engagement with the eye of the bale tie wire.
Fig. 17 is a cross section through the socketed head of the looping shaft to show the segmental slot therein.
Figure 14:
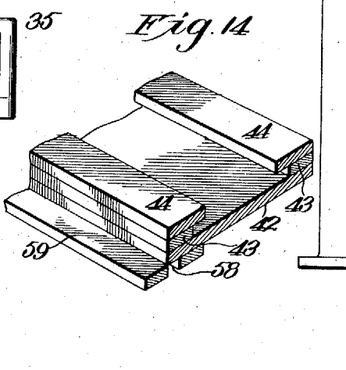
Fig. 14 is a sectional perspective view of the trackway at the working side of the table.
Figures 15, 16:
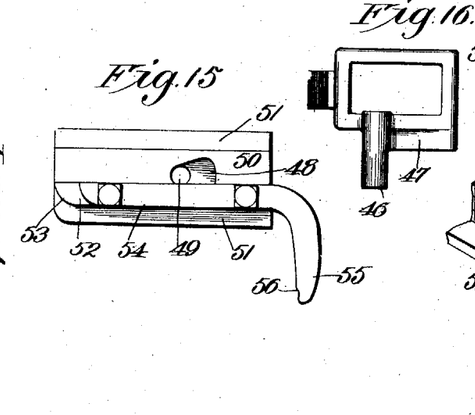
Fig. 15 is a plan view of one of the carriers detached from the chain.
Fig. 16 is a side view of one of the chain links to which the carriers are pivoted.

The strip 44 at the side of the table where the operator stands, is preferably bent inward to form a substantially V-shaped cam 45, see Fig. 10, it being further noted by reference to Fig. 9 that the upper surfaces of the strips 44 occupy about the same horizontal plane as the axis of the twister shaft 18.

The chain 35 has two of its links provided with depending cylindrical pins 46 and with shorter depending portions 47, the latter fitting in segment-shaped recesses 48 and the former in circular holes 49 opening into said recesses in the conveyers or carriers 50. Said conveyers or carriers are preferably of oblong rectangular form in plan view and provided at their lower side margins with flanges 51 of size to fit snugly in the grooves of the trackway. They are also provided at one side, viz. that disposed toward the operator when they are traveling toward the rear of the machine, with longitudinal steps 52 beveled as at 53 to engage the front edge of the V-shaped cam 45, said engagement resulting in the oscillation of the pivot pins 46 of said links, the adjustable flanges 51 at the same side passing under the contiguous strip 44 (see Fig. 10).

54 indicates bars bolted or otherwise rigidly secured on steps 52 and provided at their ends opposite from the beveled ends of the steps, with arms or hooks 55, notched as at 56, these arms or hooks being adapted when the carriers are oscillated as explained, to swing toward the operator's side of the machine and engage the eye in the bale-tie wire hereinafter referred to, so as to draw said wire longitudinally through the twister shaft, the arm or hook 55 in such movement traveling along upon the upper side of the side bar 44 provided with said cam.

57 indicates guide bolts secured to and depending from the trackway at the operator's side of the table and engaging a longitudinal slot 58 in the plate 59 underlying said trackway; and adjustable thereon and secured to or formed with the trackway at its rear end is a trip-off plate or arm 60 which extends obliquely with respect to the trackway and is provided in the plane of the upper side thereof with a bifurcation $60^a$ through which the arm or hook 55 passes and in passing is stripped by said trip-off plate of the bale tie wire as the eye of said tie is incapable of passing through said bifurcation.

At the working side of the table between the twister shaft and the guide way at the same side of the table, is the looping mechanism constructed as follows:—61 is a standard and secured to the same is a block 62 provided with a vertical groove 63 in its front side wherein is reciprocally mounted a rack bar 64. Said block 62 in conjunction with bearing caps 65 and 66 secured thereto at opposite sides of the groove, form journals for the transverse horizontal shaft 67 having its inner end enlarged as at 68, and provided with a longitudinal cylindrical socket 69 and a segmental slot 70 engaged by a set screw 71 mounted in bearing cap 65 and adapted to not only limit the oscillatory movements of shaft 67 but also secure rigidly in said socket a part hereinafter mentioned. The head 68 of shaft 67 is provided with a pin 72 projecting from its inner end and normally occupying a position at the rear side of the socket and below the plane of the axis of the twister shaft as shown most clearly in Fig. 9, and said shaft is also provided with a small cog wheel 73 meshing with the rack bar 64 hereinbefore referred to.

Figures 7, 11, 12:
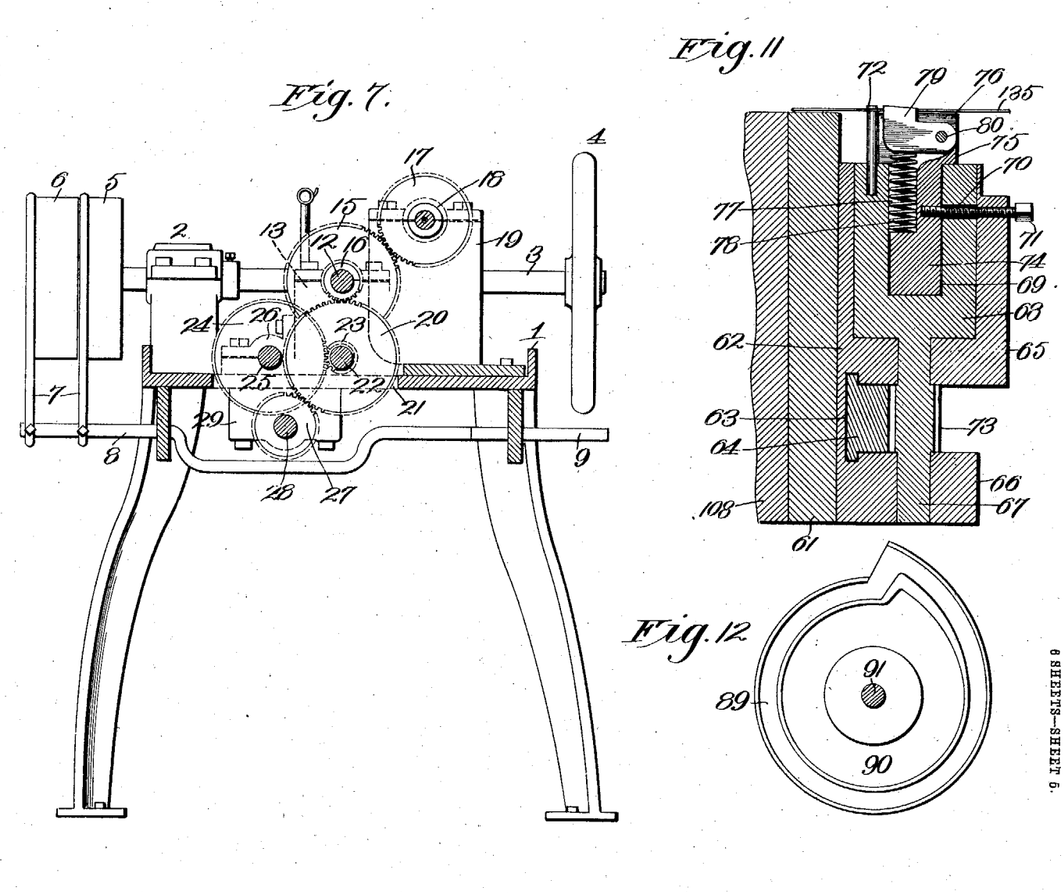
Fig. 7 is a section on the line VII—VII of Fig. 1.
Fig. 11 is a horizontal section taken on the line XI—XI of Fig. 9.
Fig. 12 is an inner face view of a cam wheel forming part of the machine.

74 indicates a cylindrical stem fitting in socket 69 and held rigidly therein by set screw 71 hereinbefore mentioned, and provided at the inner end of the head 68 of shaft 67 with a head 75, bifurcated at 76. The stem is also provided with an eccentric socket 77 containing an expansive spiral spring 78, which presses inwardly against the arm 79 of oblong-rectangular form in cross section at its free end, said arm occupying bifurcation 76 and pivoted therein as at 80, the spring 78 normally holding the free end of said arm projecting into the vertical plane of the axis of the twister shaft though slightly above the axis of said shaft as shown in Fig. 9. It will also be understood that the oblong-rectangular portion of arm 79 is contiguous to and when projected by the spring 78 stands substantially parallel with the pin 72 as shown most clearly in Fig. 11.

Figure 1:
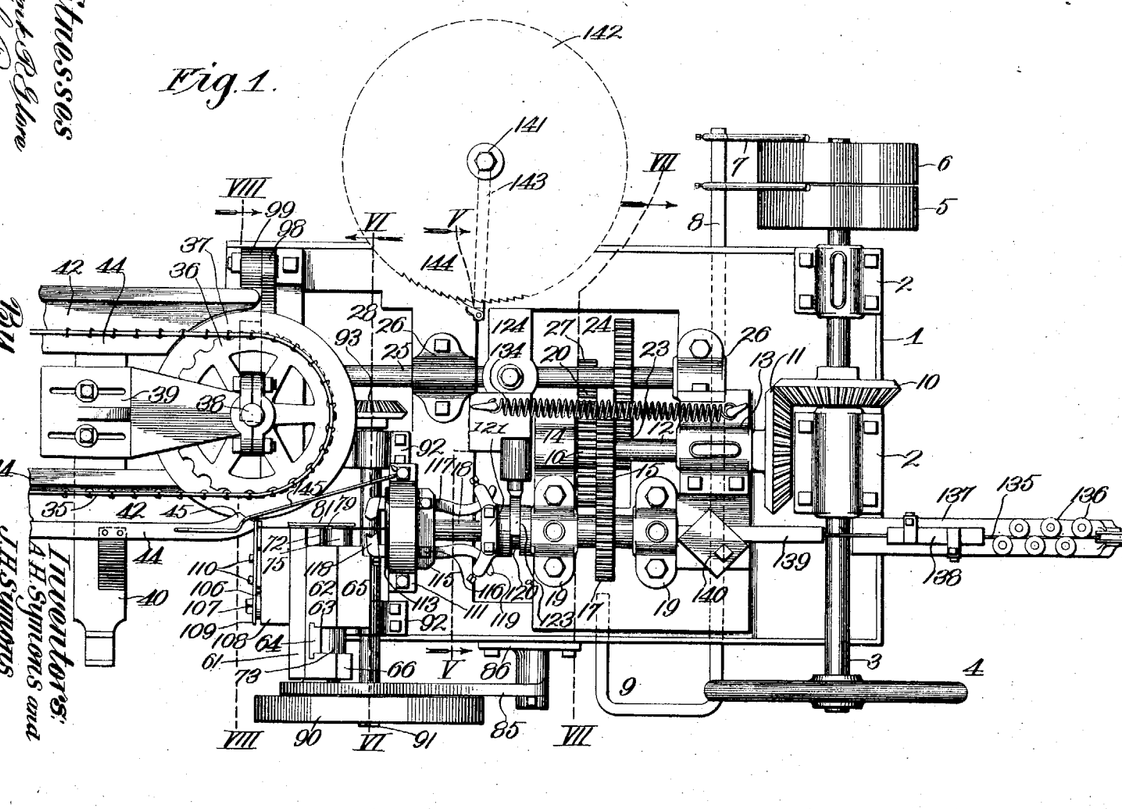
Figure 1 is a plan view of the front end of a bale tie machine embodying our invention.
Figure 2:
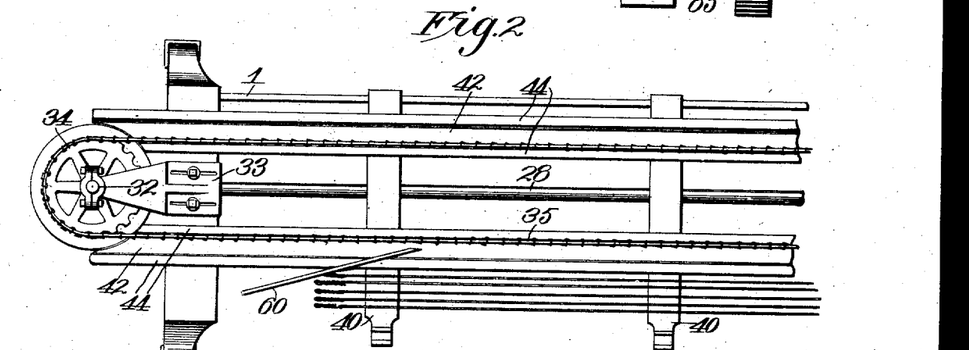
Fig. 2 is a plan view on a reduced scale, of the opposite end of the machine.
Figure 3:
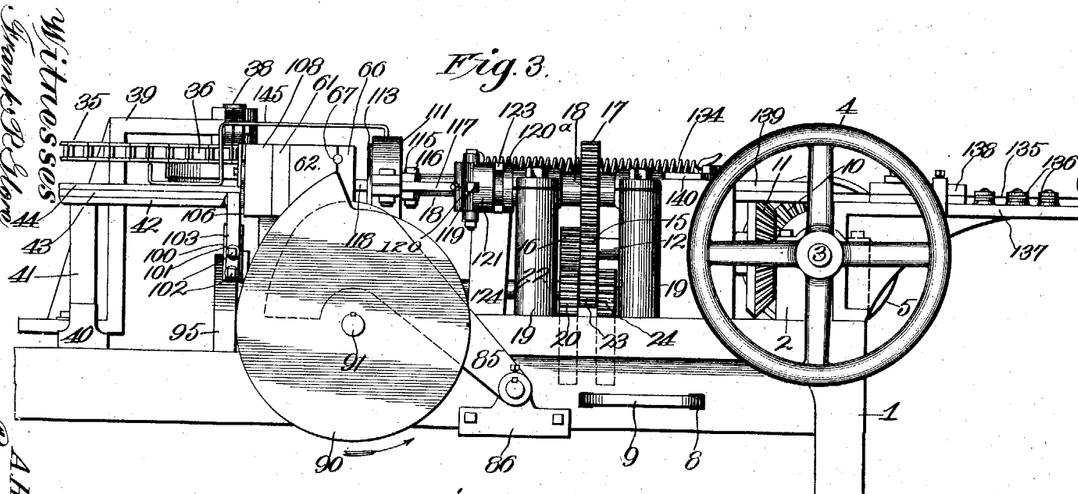
Fig. 3 is a side view of the front end of the machine, on the same scale as Fig. 1.
Figure 4:
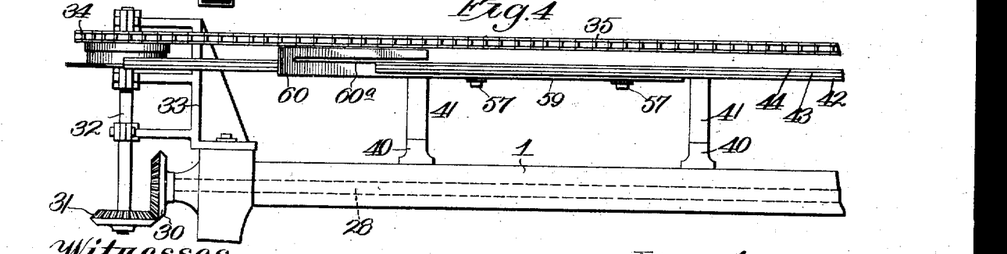
Fig. 4 is a side view of the rear end of the machine on the same scale as Fig. 2.

81 indicates a plate carried by standard 61 in a plane just inward of the axis of the twister shaft, as shown by Fig. 1, and said plate is provided with a longitudinal slot 82, into which pivoted arm 79 normally projects slightly, said slot extending from a point about in line with the axis of shaft 67 to its rear end. The arm or hook 55 of each carrier is adapted as it is oscillated in the movement hereinbefore explained, to swing outwardly through slot 82 between which and the head of the stem 74 the loop in the wire is disposed and forces the pivoted arm 79 out of the loop and replaces it therein as shown in Fig. 10, the continuous movement of chain 35 as said hook is engaged with the eye of the loop drawing the wire rearwardly until the flanges 51 are both engaged with the grooves of the trackway channel at the working side of the machine and thence along the trackway, the arm or hook 55 drawing the wire through the twister shaft and along the upper side of the substantially alined strip 44 until said arm and the eye or loop of the wire engage the trip-off plate 60 when the latter forces the loop off the end of the arm or hook and the latter passes through the bifurcation of said plate, the spring 78 reprojecting the pivoted arm 79 immediately after the carrier arm or hook started to draw the wire through the twister shaft, the wire being severed by means hereinafter described at the instant previous to the disengagement of its eye or loop from the carrier hook, the bale tie thus formed dropping down on the cross bars 40 at the working side of the table.

83 indicates a pin projecting outward from the rack bar 64 and engaging a longitudinal slot 84 in a rock arm 85 journaled on a bracket 86 secured to the table.

87 is a pin projecting outward from rock arm 85 and equipped with an antifriction roller 88 engaging a cam groove 89 of a cam wheel 90 keyed upon a transverse shaft 91 journaled in bearings 92 of the table and provided at its inner end with a bevel gear 93 meshing with a bevel gear 94 on shaft 25. The operation of shaft 25 through the gearing described operates the cam wheel and causes it through its engagement with roller 88 to rock arm 85 vertically, which movement imparts reciprocatory movement to the rack bar 64, and oscillates shaft 67 about one hundred and eighty degrees, the upward movement of the rack bar turning the shaft in the direction indicated by the arrow Fig. 9 and the downward movement in the opposite direction. The movement in the direction indicated by said arrow occurs the instant after the cutting mechanism hereinafter described severs the wire and while the latter is disposed between pin 72 and arm 79 so that said pin shall move from the position shown in full to the position shown in dotted lines in the last-named figure and thus bend or loop the end of the wire around said arm 79 as shown by dotted lines. The instant said end is thus looped around said arm, the gripping jaws hereinafter described clamp the end of the wire against the body portion while revolving and twist the wire between the point gripped and the loop-forming arm 79, as shown clearly in Fig. 10, this looping and twisting action producing an eye in the wire slightly longer and approximately the same width as the free end of the forming arm. During the twisting operation the rack bar has moved downward to its original position, this action returning pin 72 to its original position as shown in full lines Fig. 9, at about the same moment that the twisting action is completed and immediately thereafter one of the carrier hooks is projected through the slotted plate 81 and, forcing the forming arm out of the wire, takes its place therein and pulls the wire longitudinally through the twisting shaft until said eye engages the trip off plate 60 when the cutting mechanism severs the wire and the loop forming and other actions described are repeated.

Figure 8:
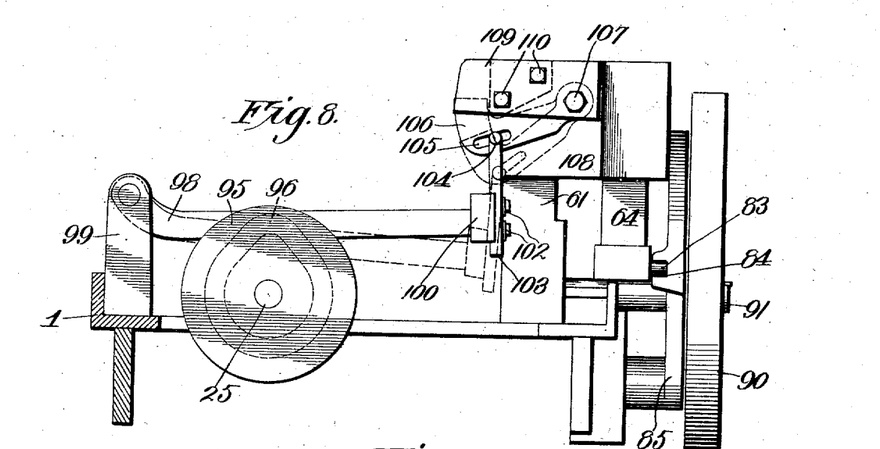
Fig. 8 is a section on the line VIII—VIII of Fig. 1 with certain parts omitted.

95 is a cam wheel provided with a cam groove 96, journaled on shaft 25 and engaging an anti-friction roller 97 carried by a rock arm 98 mounted on a bracket 99 secured to the table, said rock arm 98 extending transversely and having a head 100 provided with a groove 101 in which is adjustably secured by bolts 102 a bar 103 having a pin 104 pivotally and slidingly engaging slot 105 of a knife 106 pivoted on bolt 107 between plate 108 secured to standard 61, and a stationary knife 109, the stationary knife being secured to plate 108 by bolts 110 or otherwise. For the greater portion of the time, the movable knife occupies the position shown by dotted lines in Fig. 8, and once in each revolution of the shaft 25, is caused to move upward by cam 95 acting on arm 98, to the position shown in full lines, this upward movement of the knife occurring just as the eye of the bale-tie wire is forced off the carrier arm or hook and severing the wire which normally extends between the cutting edges of said knives.

Referring now to the twister mechanism, 111 indicates a bearing mounted upon the table just forward of standard 61 and 112 a disk journaled in said bearing and flanged at its rear end as at 113 to prevent forward movement, said disk being keyed as shown in Fig. 9 or otherwise on twister shaft 18. The disk is also provided with a pair of slots 114 and with rearwardly projecting flanges 115 at opposite sides of said slots. Arranged between said flanges and pivoted thereto as at 116 and extending longitudinally through the disk is a pair of gripper levers 117 having inwardly projecting jaws 118 at their rear ends, adapted to interlock together and grip between them the wire as hereinafter explained. The front ends of the gripper levers are curved in opposite directions to produce cam ends 119 extending slidingly through openings 120 in a collar 121 keyed to slide but not rotate on the twister shaft, said collar being provided with antifriction rollers 122 for engagement with the inner sides of said cam ends. The collar is furthermore provided with an annular groove 120$^a$ engaged by the fork of an arm 123 projecting from a rock frame 124, said frame extending down through an opening 125 in the table and being pivoted on a bolt 126 mounted in a bracket 127 bolted to and depending from the table said bolt extending transversely of the machine.

Figure 5:
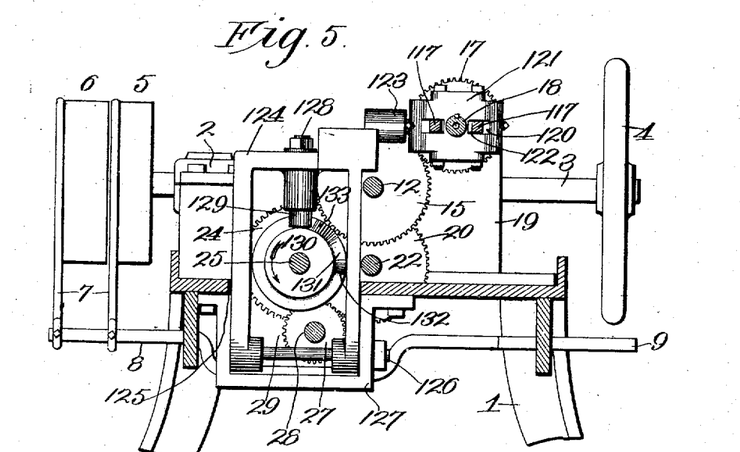
Fig. 5 is a section on the line V—V of Fig. 1.
Figures 6, 13:
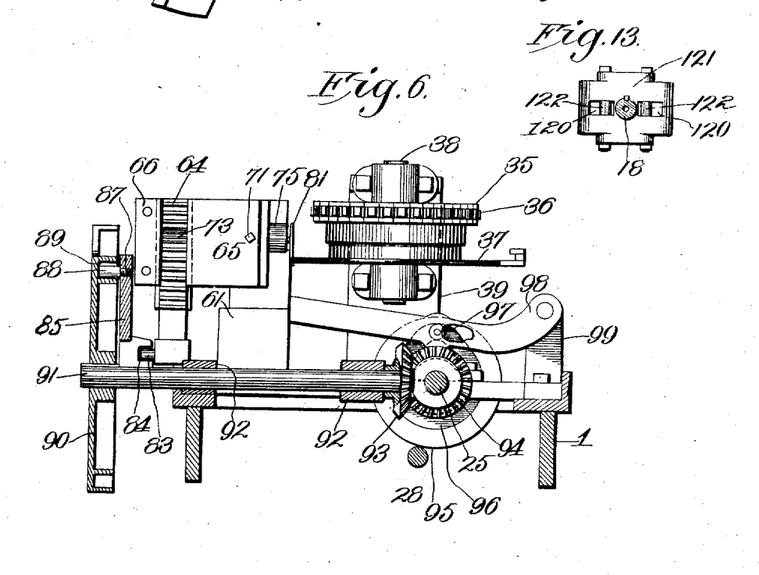
Fig. 6 is a section on line VI—VI of Fig. 1.
Fig. 13 is a view showing the twister shaft in cross section and the collar slidably mounted thereon, the gripper levers being omitted.

128 is a bolt depending from the top or bridge portion of frame 124 and provided at its lower end with an antifriction roller 129 engaging a cam wheel 130 secured on shaft 25, said cam wheel comprising a short and substantially vertical portion 131, terminating at its opposite end in an abrupt shoulder 132 and a gradually receding shoulder 133, the last-named shoulder tapering by preference to the base of shoulder 132. By this arrangement it will be seen that as the cam wheel 130 rotates in the direction indicated by the arrow Fig. 5, the roller 129 rides upward on its inclined face 133 thence across face 131, the cam surface 133 causing the frame to swing toward the looping mechanism and the portion 133 holding it at its limit of movement in said direction until the twisting operation is performed, by which time the movement of the cam has caused roller 129 to clear the abrupt shoulder 132 when the retractile spring 134 attached at its opposite ends to the swing frame and to the front bearing 13, swings said frame forward until roller 129 engages cam face 133 at its lowest point or base.

In the rearward movement of the swing frame the collar 121 slides rearward on the continuously revolving twister shaft and through the engagement of rollers 122 with the cam ends of the levers 117 forces said ends outward and causes the gripping jaws to come together and grip between them the body of the wire and the end which has just been bent back adjacent to the body by the looping mechanism as hereinbefore explained, the movement of the swing frame induced by the retractile spring 134 returning the slidable collar to its original position and reopening the jaws an instant before one of the carrier hooks engages the loop in the end of the wire. The wire 135 leading from a coil, not shown, is straightened in any suitable manner, preferably by a series of rolls 136 mounted on a bar 137 projecting forwardly and upwardly from the table. The bar 137 may be provided with a supplemental straightening device 138, through which the wire extends and from said straightening device it may pass through a straightening device 139 held in a part of the bearing 13 by the pivoted plate 140 mounted on said bearing, the bore of the straightening device 139 registering with that of the twister shaft.

141 is a bolt suitably supported from the table and forming a journal for the ratchet wheel 142 and an arm 143 the latter being disposed in the path of rock frame 124 so as to be swung rearward with each similar movement of the rock frame, said arm being provided with a spring-actuated pawl 144 to turn the ratchet wheel a distance equal to the length of one of its teeth with each rearward movement of said rock frame, the rock frame moving rearward each time a bale-tie is completed and drops upon bars 40. The wheel 142 therefore acts to count the number of ties, it being preferred that the number of bale-ties in the bundle shall equal one-half the number of teeth of said wheel.

When the machine is to be put in operation, the roll of wire is first suitably supported or arranged as customary and one end is run through the straightening mechanism and the twister shaft until it attains the position shown in Fig. 9 in which position it will be noted, it lies between plate 81, and the remaining elements of the looping mechanism. The driving belt is then shifted on the fast pulley and the machine immediately begins to operate, the first operation causes pin 72 to bend or loop the wire around arm 79 through the instrumentalities described, this operation being immediately followed by the gripping of the wire by the gripping jaws and the twisting of the wire through the rotatable movement imparted to said jaws by the twister shaft. As the twisting operation ends the wire is released by the grippers as explained and one of the hooks or arms of the carrier forces the pivoted arm 79 out of the loop and takes its place therein and pulls the wire through the twister shaft, said carrier traveling in the channeled guideway at the working side of the table and the other carrier in the companion guideway. The feeding or pulling movement of the wire continues until the arm or hook of the first-named carrier enters the bifurcation of the trip-off plate and the eye or loop of the wire engages the opposing face of said plate at which instant the movable knife 106 is forced upward and severs the wire against the companion or stationary knife, the bale-tie thus completed dropping onto the supporting bars 40 at the working side of the table, these bale ties being counted by the counting mechanism.

To insure the dropping of the ties onto the cross bars 40, and guard against their rear ends springing inwardly and possibly becoming entangled with the chain, as the wire is severed by the cutting mechanism, we provide an arched wire guide 145 secured at one end to the bearing 111 and converging from said point with respect to the wire and resting at its free end upon the bar 44 at the working side of the table. As the complete bale tie drops, a loop is formed in the end of the new wire, which is twisted to complete it, and immediately after said loop is engaged by a second carrier and the wire is again drawn through the twister shaft and severed just prior to its dislodgment by the trip-off bar, the actions described being repeated as long as the machine is in operation.

From the above description it will be apparent that we have produced a bale tie machine possessing the features of advantage enumerated as desirable and which obviously may be modified in various particulars without departing from the spirit and scope of the appended claims.

Having thus described the invention what we claim as new and desire to secure by Letters Patent, is:—

1. In a bale-tie machine, an arm having a substantially oblong rectangular non-rotatable portion, a pin contiguous to one edge and side of and parallel with said portion, and means to cause said pin to travel from its position at said edge and side of such portion to a position at the opposite side and beyond the opposite edge thereof.

2. In a bale-tie machine, a support, an arm carried thereby and having a substantially oblong rectangular non-rotatable portion projected from said support, a pin contiguous to one edge and side of and parallel with said portion, and means to cause said pin to travel from its position at said edge and side of such portion to a position at the opposite side of and beyond the opposite edge thereof.

3. In a bale-tie machine, a support, an arm carried thereby and having a substantially oblong rectangular non-rotatable portion yieldingly projected from said support, a pin contiguous to one edge and side of and parallel with said portion, and means to cause said pin to travel from its position at said edge and side of such portion to a position at the opposite side of and beyond the opposite edge thereof.

4. In a bale-tie machine, a suitable support, an arm pivoted therein and having a substantially oblong rectangular non-rotatable portion yieldingly projected beyond the support, a pin contiguous to one edge and side of and parallel with said portion, and means to cause said pin to travel from its position at the said edge and side of said portion to a position at the opposite side of and beyond the opposite edge thereof.

5. In a bale tie machine, a shaft provided with an eccentrically-disposed pin at one end, a stationary support within said shaft, an arm having a substantially oblong rectangular portion projecting from said support, and means to cause said pin to travel from its position at said edge and side of such portion to a position at the opposite side of and beyond the opposite edge thereof.

6. In a bale-tie machine, an arm having a substantially oblong rectangular non-rotatable portion, a pin contiguous to one edge and side of and parallel with said portion, and means to cause said pin to travel from its position at said edge and side of such portion to a position at the opposite side of and beyond the opposite edge thereof, and then return to its original position.

7. In a bale-tie machine, a shaft provided with an eccentrically-disposed pin at one end, a stationary support within said shaft, an arm having a substantially oblong rectangular portion projecting from said support, and means to cause said pin to travel from its position at said edge and side of such portion to a position at the opposite side of and beyond the opposite edge thereof, and then return to its original position.

8. In a bale-tie machine, a support, an arm carried thereby and having a substantially oblong rectangular non-rotatable portion yieldingly projected from said support, a pin contiguous to one edge and side of and parallel with said portion, and means to cause said pin to travel from its position at said edge and side of such portion to a position at the opposite side of and beyond the opposite edge thereof, and then return to its original position.

9. In a bale tie machine, a shaft provided with a central cylindrical socket in one end, a support fitting in said socket and held stationary therein, an arm carried by the support, and having a portion yieldingly projected beyond the end of the latter, a pin projecting eccentrically from the end of said shaft, and means to cause said shaft to oscillate approximately one hundred and eighty degrees so as to cause its pin to move approximately half way round the projecting portion of said arm and back again.

10. In a bale-tie machine, a shaft provided with a central cylindrical socket in one end, a support fitting in said socket and held stationary therein, an arm carried by the support, and having a portion yieldingly projected beyond the end of the latter, a pin projecting eccentrically from the end of said shaft, means to cause said shaft to oscillate approximately one hundred and eighty degrees so as to cause its pin to move approximately half way round the projecting portion of said arm and back again, and means to positively limit the turning movement of the shaft in both directions.

11. In a bale-tie machine, a shaft provided with a central cylindrical socket in one end, a support fitting in said socket and held stationary therein and provided with a socket, a spring therein, an arm mounted in said support and having a portion held yieldingly projected beyond the end of said support by said spring, a pin projecting eccentrically from the end of said shaft, and means to cause said shaft to oscillate approximately one hundred and eighty degrees so as to cause its pin to move approximately half way round the projecting portion of said arm and back again.

12. In a bale-tie machine, a shaft suitably journaled, a non-rotatable arm suitably supported at one end of said shaft and having a portion rectangular in cross-section and disposed eccentrically of the shaft, a pin projecting eccentrically from the shaft and extending parallel with said portion, a driven shaft, and means whereby the movement of said shaft shall impart oscilatory movement to the first-named shaft.

13. In a bale-tie machine, a shaft suitably journaled, a non-rotatable arm suitably supported at one end of said shaft and having a portion rectangular in cross section and disposed eccentrically of the latter, a pin projecting eccentrically from the shaft and extending parallel with said portion, a swing arm connected to impart oscillatory movement to said shaft, and driven means to rock said arm back and forth.

14. In a bale-tie machine, a shaft suitably journaled, an arm suitably supported at one end of said shaft and having a portion disposed eccentrically of the latter, a pin projecting eccentrically from the shaft, a swing arm connected to impart oscillatory movement to said shaft, and a driven cam wheel to impart back and forth movement to said rock arm.

15. In a bale-tie machine, a shaft suitably journaled, an arm suitably supported at one end of said shaft and having a portion disposed eccentrically of the latter, a pin projecting eccentrically from the shaft, a plate spaced from the end of said support and said pin and provided with a longitudinal slot opposite the projecting portion of said arm and said pin, and means to oscillate said shaft.

16. In a bale-tie machine, a shaft suitably journaled, an arm suitably supported at one end of said shaft and having a portion disposed eccentrically of the latter and yieldingly projected beyond the end of the support, a pin projecting eccentrically from the shaft, a plate spaced from the end of said support and said pin and provided with a longitudinal slot opposite the projecting portion of said arm and said pin, and means to oscillate said shaft.

17. In a bale-tie machine, a shaft, a support at one end of the same, an arm having a portion yieldingly projected beyond the end of said support, a pin projecting eccentrically from the shaft, a plate disposed beyond the end of said support and said pin and provided with a longitudinal slot opposite the projecting portion of said arm and said pin, and means to enter said slot and repress said arm and then travel longitudinally through the slot thereof and beyond said plate.

18. In a bale tie machine, the combination of a suitable support, an arm having a portion pressed yieldingly beyond one end of said support, a shaft provided with an eccentric pin, a slotted plate beyond said arm and pin with the slot opposite said elements, a driven tubular shaft through which the bale wire extends and projects between said support and said slotted plate and between the projecting portion of said arm and said pin, means to turn said shaft and cause the pin to bend the projecting end of the wire around the arm, a gripping mechanism carried by the twister shaft, means to cause the gripping mechanism to grip the body of the wire and its end and twist the same together, and means to revolve the first-named shaft back to its original position while such twisting operation is in progress.

19. In a bale tie machine, the combination of a suitable support, an arm having a portion pressed yieldingly beyond one end of said support, a shaft provided with an eccentric pin, a slotted plate beyond said arm and pin with the slot opposite said elements, a driven tubular shaft through which the bale wire extends and projects between said support and said slotted plate and between the projecting portion of said arm and said pin, means to turn said shaft and cause the pin to bend the projecting end of the wire around the arm, a gripping mechanism to grip the body of the wire and its end and twist the same together and then effect the release of the twisted wire, means to revolve the first-named shaft back to its original position while the twisting operation is in progress, and an endless conveyer provided with a carrier having a hook adapted to project through the slotted plate and force said arm out of the loop or eye formed in the wire and engage said loop or eye and pull the wire through the twister shaft.

20. In a bale tie machine, the combination of a suitable support, an arm having a portion pressed yieldingly beyond one end of said support, a shaft provided with an eccentric pin, a slotted plate beyond said arm and pin with the slot opposite said elements, a driven tubular shaft through which the bale wire extends and projects between said support and said slotted plate and between the projecting portion of said arm and said pin, means to turn said shaft and cause the pin to bend the projecting end of the wire around the arm, a gripping mechanism to grip the body of the wire and its end and twist the same together and then effect the release of the twisted wire, means to revolve the first-named shaft back to its original position while the twisting operation is in progress, an endless conveyer provided with a carrier having a hook adapted to project through the slotted plate and force said arm out of the loop or eye formed in the wire and engage said loop or eye and pull the wire through the twister shaft, means to trip the eye of the wire from engagement with the hook, and means to sever the wire about the time said tripping action occurs.

21. In a machine of the character described, a driven twister shaft through which the wire extends, a disk rigid on said shaft and provided with openings at opposite sides of the latter, a pair of levers extending through said openings and pivoted to the disk and provided at one end beyond the contiguous end of the shaft with gripping jaws to engage the wire and having their opposite ends terminating in cam ends, a collar keyed to slide upon and rotate with the shaft and provided with openings through which said cam ends extend and with an annular groove, a rock frame having a forked arm engaging said groove, and means to rock said frame in one direction to cause said collar to close the jaws upon the wire and then to reverse such movement to cause the jaws to release the wire.

22. In a bale tie machine, the combination of a looping mechanism to bend the wire, a mechanism to twist said end of the wire and the body portion together to complete the loop or eye, an endless traveling conveyer, a trackway having a grooved channel underlying said conveyer and having a cam at its front end, a carrier block pivotally carried by said conveyer and adapted to travel in the channel of the trackway and provided with flanges to engage the grooves of the channel and with a hook, and with a rounded step portion to engage the cam of the trackway to cause the carrier block to oscillate and the hook thereof to engage the eye or loop of the wire and draw the same longitudinally through the twister shaft.

In testimony whereof we affix our signatures, in the presence of two witnesses.

ARTHUR H. SYMONS.
JABEZ H. SYMONS.

Witnesses:
H. C. RODGERS,
G. Y. THORPE.